United States Patent
Suciu et al.

(10) Patent No.: US 10,240,526 B2
(45) Date of Patent: Mar. 26, 2019

(54) GAS TURBINE ENGINE WITH HIGH SPEED LOW PRESSURE TURBINE SECTION

(71) Applicant: United Technologies Corporation, Farmington, CT (US)

(72) Inventors: Gabriel L. Suciu, Glastonbury, CT (US); Frederick M. Schwarz, Glastonbury, CT (US); William K. Ackermann, East Hartford, CT (US); Daniel Bernard Kupratis, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/682,848

(22) Filed: Aug. 22, 2017

(65) Prior Publication Data
US 2017/0370285 A1 Dec. 28, 2017

Related U.S. Application Data

(63) Continuation-in-part of application No. 14/568,167, filed on Dec. 12, 2014, which is a continuation-in-part of application No. 13/410,776, filed on Mar. 2, 2012, now abandoned, which is a continuation-in-part of application No. 13/363,154, filed on Jan. 31, 2012, now abandoned.

(Continued)

(51) Int. Cl.
*F02C 3/113* (2006.01)
*F02C 7/36* (2006.01)
(Continued)

(52) U.S. Cl.
CPC ............. *F02C 3/113* (2013.01); *F02C 3/06* (2013.01); *F02C 7/36* (2013.01); *F02C 9/16* (2013.01);
(Continued)

(58) Field of Classification Search
CPC .... F02C 3/113; F02C 3/06; F02C 7/36; F02C 9/16; F02K 3/06
See application file for complete search history.

(56) References Cited

U.S. PATENT DOCUMENTS 2,936,655 A 5/1960 Peterson et al.
3,021,731 A 2/1962 Stoeckicht
(Continued)

FOREIGN PATENT DOCUMENTS

CN 1952367 A 4/2007
EP 2071139 A2 6/2009
(Continued)

OTHER PUBLICATIONS

EASA Type-Certificate Data Sheet for RB211 Trent 800 series engines, TCDS E.047, Oct. 2013.*

(Continued)

*Primary Examiner* — Steven Sutherland
(74) *Attorney, Agent, or Firm* — Carlson, Gaskey & Olds, P.C.

(57) ABSTRACT

A compressor section is in fluid communication with a fan, which includes a first compressor section and a second compressor section. A turbine section includes a first turbine section driving the fan and the first compressor section and a second turbine section driving the second compressor section and the second compressor rotor. A first performance quantity is defined as a product of the first speed squared and the first area. A second performance quantity is defined as a product of the second speed squared and the second exit area. A performance ratio of the first performance quantity to the second performance quantity is between about 0.2 and about 0.8. A gear reduction is included between the first turbine section and the first compressor section.

13 Claims, 2 Drawing Sheets

Related U.S. Application Data

(60) Provisional application No. 61/604,653, filed on Feb. 29, 2012.

(51) Int. Cl.
    *F02C 9/16*         (2006.01)
    *F02K 3/06*         (2006.01)
    *F02C 3/06*         (2006.01)
    *F02K 3/072*       (2006.01)

(52) U.S. Cl.
    CPC .............. *F02K 3/06* (2013.01); *F02K 3/072* (2013.01); *F05D 2200/221* (2013.01); *F05D 2220/323* (2013.01); *F05D 2220/3215* (2013.01); *F05D 2260/40311* (2013.01); *F05D 2270/20* (2013.01)

(56) References Cited

U.S. PATENT DOCUMENTS

| | | |
|---|---|---|
| 3,194,487 A | 7/1965 | Tyler et al. |
| 3,250,512 A | 5/1966 | Petrie |
| 3,287,906 A | 11/1966 | McCormick |
| 3,352,178 A | 11/1967 | Lindgren et al. |
| 3,527,054 A | 9/1970 | Hemsworth |
| 3,729,957 A | 5/1973 | Petrie et al. |
| 3,747,343 A | 7/1973 | Rosen |
| 3,754,484 A | 8/1973 | Roberts |
| 3,861,139 A | 1/1975 | Jones |
| 3,886,737 A | 6/1975 | Grieb |
| 3,892,358 A | 7/1975 | Gisslen |
| 3,932,058 A | 1/1976 | Harner et al. |
| 3,935,558 A | 1/1976 | Miller et al. |
| 4,130,872 A | 12/1978 | Harloff |
| 4,304,522 A | 12/1981 | Newland |
| 4,693,616 A | 9/1987 | Rohra et al. |
| 4,809,498 A | 3/1989 | Giffin, III et al. |
| 4,887,424 A | 12/1989 | Geidel et al. |
| 4,909,031 A | 3/1990 | Grieb |
| 4,916,894 A | 4/1990 | Adamson et al. |
| 4,947,642 A | 8/1990 | Grieb et al. |
| 5,010,729 A | 4/1991 | Adamson et al. |
| 5,433,674 A | 7/1995 | Sheridan et al. |
| 5,447,411 A | 9/1995 | Curley et al. |
| 5,520,512 A | 5/1996 | Walker et al. |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,381,948 B1 | 5/2002 | Klingels |
| 6,607,165 B1 | 8/2003 | Manteiga et al. |
| 6,619,030 B1 | 9/2003 | Seda et al. |
| 6,814,541 B2 | 11/2004 | Evans et al. |
| 7,021,042 B2 | 4/2006 | Law |
| 7,328,580 B2 | 2/2008 | Lee et al. |
| 7,451,592 B2 | 11/2008 | Taylor et al. |
| 7,513,102 B2 | 4/2009 | Moniz et al. |
| 7,591,754 B2 | 9/2009 | Duong et al. |
| 7,600,370 B2 | 10/2009 | Dawson |
| 7,694,505 B2 | 4/2010 | Schilling |
| 7,721,549 B2 | 5/2010 | Baran |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang et al. |
| 8,061,969 B2 | 11/2011 | Durocher et al. |
| 8,091,371 B2 | 1/2012 | Durocher et al. |
| 8,205,432 B2 | 6/2012 | Sheridan |
| 8,297,916 B1 | 10/2012 | McCune et al. |
| 9,133,729 B1 | 9/2015 | McCune et al. |
| 9,297,917 B2 | 3/2016 | Mah et al. |
| 9,631,558 B2 | 4/2017 | McCune et al. |
| 2006/0236675 A1 | 10/2006 | Weiler |
| 2008/0003096 A1 | 1/2008 | Kohli et al. |
| 2009/0056343 A1 | 3/2009 | Suciu et al. |
| 2009/0092494 A1 | 4/2009 | Cairo et al. |
| 2009/0229242 A1 | 9/2009 | Schwark |
| 2010/0105516 A1 | 4/2010 | Sheridan |
| 2010/0148396 A1 | 6/2010 | Xie et al. |
| 2010/0331139 A1 | 12/2010 | McCune |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0171018 A1 | 7/2012 | Hasel et al. |
| 2012/0291449 A1 | 11/2012 | Adams |
| 2013/0192200 A1 | 8/2013 | Kupratis et al. |
| 2013/0192263 A1 | 8/2013 | Suciu et al. |
| 2013/0195648 A1 | 8/2013 | Schwarz et al. |
| 2013/0223986 A1 | 8/2013 | Kupratis et al. |
| 2014/0130479 A1 | 5/2014 | Schwarz et al. |
| 2016/0032826 A1 | 2/2016 | Rued |

FOREIGN PATENT DOCUMENTS

| | | |
|---|---|---|
| EP | 2896785 A1 | 7/2015 |
| FR | 2912181 | 8/2008 |
| GB | 1516041 | 6/1978 |
| GB | 2041090 | 9/1980 |
| JP | 57-171032 A | 10/1982 |
| JP | 2014156861 A | 8/2014 |
| WO | 2007038674 | 4/2007 |
| WO | 2014018142 A2 | 1/2014 |

OTHER PUBLICATIONS

Ahmad, Fathi, "Single vs Two Stage High Pressure Turbine Design of Modern Aero Engines", 1999, ASME.*
NASA/TM 2010-216758—Assessment of Aerodynamic Challenges of a Variable-Speed Power Turbine for Large Civil Tilt-Rotor Application, Welch, Aug. 2010.
NASA/TM 2012-217605—Variable-Speed-Power-Turbine Research at Glenn Research Center, Welch, Jul. 2012.
P&W Propulsion Systems Studies, NASA High Speed Research Workshop, May 14-16, 1991.
Design Optimization of a Variable-Speed Power-Turbine, Hendricks, et al., Jul. 2014.
NASA/CR 2012-217424—Variable-Speed Power-Turbine for the Large Civil Tilt Rotor, Suchezky, Feb. 2012.
Architectural Comparison of Advanced Ultra-High Bypass Ratio Turbofans for Medium to Long Range Application, Bijewitz, 2014.
Prior Art Direct Drive Engines.
Jane's Aero-Engines, Issue Seven, Copyright 2000, pp. 510-512.
Mattingly, et al., Aircraft engine Design 2nd Ed., American Institute of Aeronautics and Astronautics, Inc., 2002, ISBN 1-56347-538-3, pp. 292-310.
NASA Conference Publication. Quiet, powered-lift propulsion. Cleveland, Ohio. Nov. 14-15, 1978.
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
European Search Report for European Application No. 15199577.6 dated May 12, 2016.
"The Geared Turbofan Technology—Opportunities, Challenges and Readiness Status," C. Riegler, C. Bichlmaier, MTU Aero Engines GmbH, Germany.
"Geared Fan," Dr. Gunter Wilfert, MTU Aero Engines, Germany.

(56) References Cited

OTHER PUBLICATIONS

"CLEAN—Validation of a High Efficient Low NOx core, a GTF High Speed Turbine and an Integration of a Recuperator in an Environmental Friendly engine Concept," Dr. Gunter Wilfert, et al., AIAA 2005-4195, Jul. 1-13, 2005.
Energy Efficient Engine High-Pressure Turbine Uncooled Rig Technology Report, NASA CR-16149, Oct. 1981.
Federal Aviation Administration Advisory Circular dated Apr. 13, 2006 on Calibration Test, Endurance Test and Teardown Inspection for Turbine Engine Certification.
Nagendra, S. et al., "Optimal rapid multidisciplinary response networks: RAPIDDISK," Structural and Multidisciplinary Optimization, Springer, Berlin, DE, vol. 29, No. 3, Mar. 1, 2005, pp. 213-231.
European Search Report for European Patent Application No. 13775188.9 completed Nov. 3, 2015.
International Search Report from parent counterpart PCT application PCT/US13/22378, dated Sep. 13, 2013.
Kurzke, J. (2009). Fundamental differences between conventional and geared turbofans. Proceedings of ASME Turbo Expo: Power for Land, Sea, and Air. 2009, Orlando, Florida. pp. 145-153.
NASA CR-165608, Energy Efficient Engine High-Pressure Turbine Detailed Design Report, Thulin, Jan. 1982.
IPR Petition of U.S. Pat. No. 8,899,915, dated Dec. 21, 2016.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Agarwal, B.D and Broutman, L.J. (1990). Analysis and performance of fiber composites, 2nd Edition. John Wiley & Sons, Inc. New York: New York. pp. 1-30, 50-61, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Petition for Inter Partes Review of U.S. Pat. No. 8,899,915. *General Electric Company*, Petitioner, v. *United Technologies Corporation*, Patent Owner. Filed Dec. 21, 2016.

(56) References Cited

OTHER PUBLICATIONS

Kurzke, J., Preliminary Design, Aero-Engine Design: From State of the Art Turbofans Towards Innovative Architectures. Mar. 3-7, 2008. pp. 1-72.
Willis, W.S., Quiet Clean Short-Haul Experimental Engine (QCSEE) Final Report. Aug. 1979.
Leckie, F.A. and Dal Bello, D.J. (2009). Strength and stiffness of engineering systems. Mechanical Engineering Series. Springer. pp. 1-3 (improperly identified as Bauchau on IPR Petition (filed on IDS dated Feb. 2016).
Declaration of Raymond Drago. In re U.S. Pat. No. 8,899,915 under 37 C.F.R. § 1.68. Executed Dec. 9, 2016. pp. 1-38.
Thulin, R.D. et al., NASA CR-165608, Energy Efficient Engine, High-Pressure Turbine Detailed Design Report. Jan. 1982.
NASA Technical Memorandum—Analysis of Turbofan Propulsion System Weight and Dimensions, Mark H. Waters, et al., Jan. 1977.
European Search Report for European Application No. 16197814.3 dated Mar. 30, 2017.
Decision Denying Institution of Inter Partes Review. *General Electric Company.*, Petitioner, v. *United Technologies Corp.*, Patent Owner. IPR2017-00522. U.S. Pat. No. 8,899,915. Entered Jun. 23, 2017. pp. 1-18.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.

(56) References Cited

OTHER PUBLICATIONS

Daly, M. and Gunston, B. (2008). Jane's Aero-Engines. Pratt & Whitney PW8000. Issue Twenty-three.
Honeywell Sabreliner 65 TFE731-3 to -3D Engine Upgrade Program. Oct. 2005. pp. 1-4.
Honeywell Learjet 31 and 35/36 TFE731-2 to 2C Engine Upgrade Program. Sep. 2005. pp. 1-4.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
English Translation of Notice of Opposition to Patent No. EP2949882. United Technologies Corporation opposed by Rolls Royce. Mailed Aug. 23, 2017.
English Translation of Notice of Opposition to Patent No. EP2811120. United Technologies Corporation opposed by Safran Aircraft Engines. Mailed Jul. 12, 2017.
English Translation of Notice of Opposition to Patent No. EP299882. United Technologies Corporation opposed by Safran Aircraft Engines. Mailed May 23, 2018.
English Translation of Notice of Opposition to Patent No. EP2811120. United Technologies Corporation opposed by Rolls Royce. Issued on Apr. 12, 2018.
Product Brochure. BR710. Rolls-Royce. Copyright 2008. pp. 1-4.
Praisner, T.J., Grover, E., Mocanu, R., Jurek, R., and Gacek, R. (2010). Predictions of unsteady Interactions between closely coupled HP and LP turbines with co-and counter-rotation. Proceedings of ASME Turbo Expo 2010. Jun. 14-18, 2018. Glasgow, UK. p. 1-10.

Pratt & Whitney PW8000. Jane's Aero-Engines. Jane's by IHS Markit. Sep. 30, 2010.
Annexe Mesures- Methodologie de mesure et de calcul. Cited in: Notice of Opposition for European Patent No. 2809932 dated Oct. 1, 2018.
Fowler, T.W. Ed. (1989). Jet engines and propulsion systems for engineers. GE Aircraft Engines. Training and Educational Development and the University of Cincinnati for Human Resource Development. pp. 1-516.
Walsh, P.P. and Fletcher, P. (2004). Gas turbine performance, 2nd Edition. Oxford, UK: Blackwell Science. pp. 1-658.
ASME International Gas Turbine Institute. (Apr. 2013). Trends in the global energy supply and implications for the turbomachinery industry. Global Gas Turbine News, vol. 53(2). pp. 49, 53.
Halle J. E. and Michael, C. J. (1984). Energy efficient engine fan component detailed design report. NASA-CR-165466. pp. 1-135.
Fitzpatrick, G.A., Broughton, T. (1987). The Rolls-Royce wide chord fan blade. Rolls-Royce Reporting. Mar. 19, 1987. pp. 1-19.
Fitzpatrick, G.A. and Broughton, T. (1988). Diffusion bonding aeroengine components. Def Scie J vol. 38(4). Oct. 1998. pp. 477-85.
(1987). Wide-chord fan—12 years of development. Aircraft Engineering and Aerospace Technology. vol. 59, issue 7. pp. 10-11. Retrieved Jul. 31, 2008 from: https://doi.org/10.1108/eb036471.
Product Brochure. TFE731 Engines: A new generation meeting your highest expectations for reliability, cost of ownership and performance. Allied Signal Aerospace. Copyright 1996. pp. 1-10.
Engine Alliance GP7200. Jane's Aero-Engines. Jane's by IHS Markit. Jul. 12, 2010.
General Electric GE90. Jane's Aero-Engines. Jane's by IHS Markit. Nov. 1, 2010.
Pratt & Whitney PW2000. Jane's Aero-Engines. Jane's by IHS Markit. Sep. 29, 2010.
Treager, I.E. (1995). Aircraft gas turbine engine technology, 3rd Edition. GLENCOE Aviation Technology Series. McGraw-Hill.
Pratt & Whitney PW6000. Jane's Aero-Engines. Jane's by IHS Markit. Nov. 22, 2010.
United Technologies Pratt & Whitney. Jane's Aero-Engines. Jane's by IHS Markit. Aug. 30, 2000.
General Electric CF34. Jane's Aero-Engines. Jane's by IHS Markit. Jul. 26, 2010.
CFM International CFM56. Jane's Aero-Engines. Jane's by IHS Markit. Jan. 31, 2011.
Roux, E. (2007). Turbofan and turbojet engines database handbook. Editions Elodie Roux. Blagnac: France. pp. 41-3 and 464-9.
U.S. Department of Transportation: Federal Aviation Administration Type Certificate Data Sheet No. E00064EN. Dated: Nov. 24, 2006. p. 1-5.
*Dr. Raymond G. Tronzo* v. *Biomet Inc.*, 156 F.3d 1154 (1998).
Third Party Observations for European Patent Application No. 14155460.0 dated Oct. 29, 2018 by Rolls Royce.
Pratt & Whitney Aircraft Group, "Energy Efficient Engine Flight Propulsion System Preliminary Analysis and Design Report", 1979, NASA CR-159487, p.i-450.

\* cited by examiner

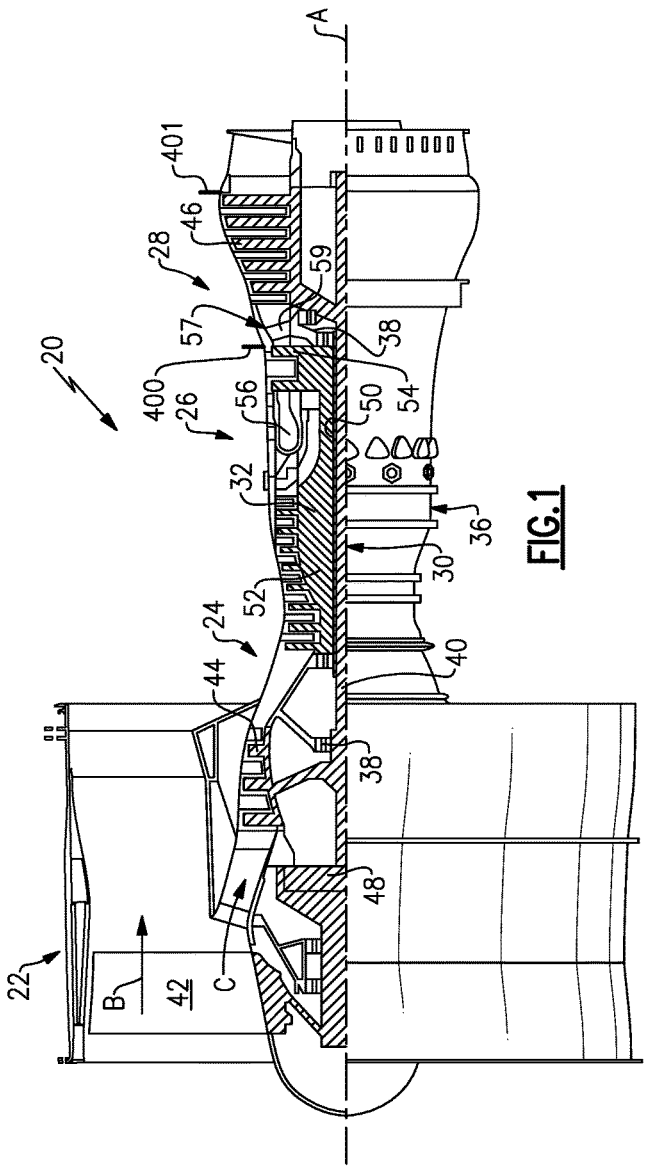
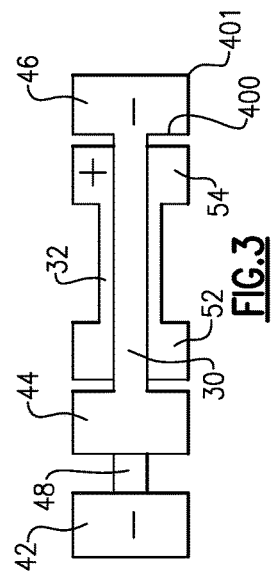
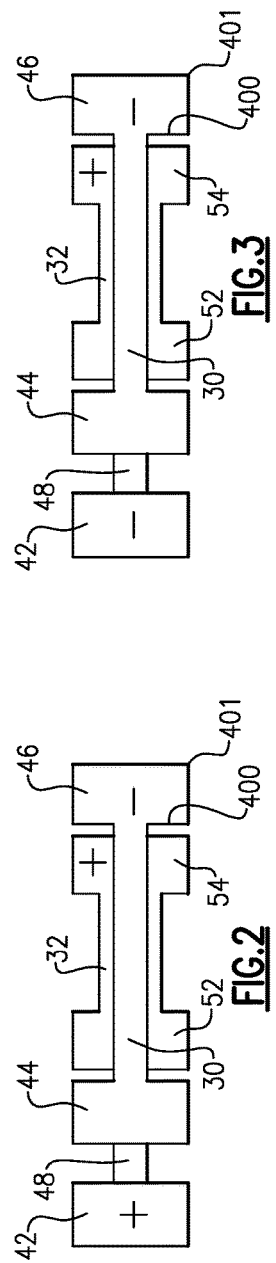

GAS TURBINE ENGINE WITH HIGH SPEED LOW PRESSURE TURBINE SECTION

CROSS-REFERENCE TO RELATED APPLICATION

This application is a continuation-in-part of U.S. application Ser. No. 14/568,167, filed Dec. 12, 2014, which is a continuation-in-part of U.S. application Ser. No. 13/410,776, filed Mar. 2, 2012, which claims priority to U.S. Provisional Application No. 61/604,653, filed Feb. 29, 2012, and is a continuation-in-part of U.S. patent application Ser. No. 13/363,154, filed on Jan. 31, 2012.

BACKGROUND OF THE INVENTION

This application relates to a gas turbine engine wherein the low pressure turbine section is rotating at a higher speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan so as to allow the fan to rotate a different, more optimal speed.

SUMMARY

In a featured embodiment, a gas turbine engine has a fan including fan blades. A bypass ratio is greater than 13. A compressor section is in fluid communication with the fan, which includes a first compressor section and a second compressor section. A combustion section is in fluid communication with the compressor section. A turbine section is in fluid communication with the combustion section. The turbine section includes a first turbine section driving the fan and the first compressor section and a second turbine section driving the second compressor section and the second compressor rotor. The first turbine section has a first exit area at a first exit point and rotates at a first speed. The second turbine section has a second exit area at a second exit point and rotates at a second speed, which is higher than the first speed. A first performance quantity is defined as a product of the first speed squared and the first area. A second performance quantity is defined as a product of the second speed squared and the second exit area. A performance ratio of the first performance quantity to the second performance quantity is between about 0.2 and about 0.8. A gear reduction is included between the first turbine section and the first compressor section, such that the first compressor section and the fan rotate at a lower speed than the first turbine section.

In another embodiment according to the previous embodiment, the gear reduction is a planetary gear reduction.

In another embodiment according to any of the previous embodiments, a gear ratio of the gear reduction is greater than 2.0 and less than 5.0.

In another embodiment according to any of the previous embodiments, the gear ratio is greater than 2.5.

In another embodiment according to any of the previous embodiments, the bypass ratio is less than 22.

In another embodiment according to any of the previous embodiments, the fan has 26 or fewer blades, and the first turbine section has at least three stages and up to six stages.

In another embodiment according to any of the previous embodiments, the first turbine section includes an inlet, an outlet, and a pressure ratio greater than 7.5, wherein the pressure ratio is a ratio of a pressure measured prior to the inlet as related to a pressure at the outlet prior to any exhaust nozzle.

In another embodiment according to any of the previous embodiments, a low fan pressure ratio is less than 1.35 across the fan blades alone.

In another embodiment according to any of the previous embodiments, the performance ratio is less than or equal to 0.5.

In another embodiment according to any of the previous embodiments, a mid-turbine frame is intermediate the first and second turbine sections, and has at least one bearing.

In another embodiment according to any of the previous embodiments, the second speed is between three and four times the first speed.

In another embodiment according to any of the previous embodiments, the second speed is between three and four times the first speed.

In another embodiment according to any of the previous embodiments, the fan has a fan tip speed less than 1150 ft/sec.

In another embodiment according to any of the previous embodiments, the performance ratio is less than or equal to 0.5.

In another embodiment according to any of the previous embodiments, the second speed is between three and four times the first speed.

In another embodiment according to any of the previous embodiments, a gear ratio of the gear reduction is greater than 2.0 and less than 5.0.

In another embodiment according to any of the previous embodiments, the gear ratio is greater than 2.5.

In another embodiment according to any of the previous embodiments, a pressure ratio across the first turbine section is greater than 7.5, and wherein the pressure ratio is a ratio of a pressure measured prior to the inlet as related to a pressure at the outlet prior to any exhaust nozzle.

In another embodiment according to any of the previous embodiments, the bypass ratio is less than 22.

In another embodiment according to any of the previous embodiments, the fan has 26 or fewer blades, the first turbine section has at least three stages and up to six stages.

In another embodiment according to any of the previous embodiments, the fan has a fan tip speed less than 1150 ft/sec.

In another embodiment according to any of the previous embodiments, a gear ratio of the gear reduction is greater than 2.5.

In another embodiment according to any of the previous embodiments, the bypass ratio is less than 22, the fan has 26 or fewer blades and the first turbine section has at least three stages and has up to six stages.

In another embodiment according to any of the previous embodiments, the fan has a fan tip speed less than 1150 ft/sec.

In another embodiment according to any of the previous embodiments, the second speed is greater than twice the first speed and less than three times the first speed.

In another embodiment according to any of the previous embodiments, the fan has a fan tip speed less than 1150 ft/sec.

In another embodiment according to any of the previous embodiments, the bypass ratio is less than 22, the fan has 26 or fewer blades and the first turbine section has at least three stages and has up to six stages.

In another embodiment according to any of the previous embodiments, the gear reduction is a planetary gear reduction.

In another embodiment according to any of the previous embodiments, a low fan pressure ratio is less than 1.35 across the fan blades alone.

In another featured embodiment, a gas turbine engine has a first turbine section and a second turbine section. The first turbine section has a first exit area at a first exit point and rotates at a first speed. The first turbine section has at least 3 stages. The second turbine section has a second exit area at a second exit point and rotates at a second speed, which is faster than the first speed, the second turbine section having 2 or fewer stages. A first performance quantity is defined as a product of the first speed squared and the first area. A second performance quantity is defined as a product of the second speed squared and the second area. A ratio of the first performance quantity to the second performance quantity is between 0.5 and 1.5. A gear reduction is included between a fan and a low spool driven by the first turbine section such that the fan rotates at a lower speed than the first turbine section. The first and second turbine sections are designed to rotate in opposed directions relative to each other, and a pressure ratio across the first turbine section is greater than 5, wherein the pressure ratio is a ratio of a pressure measured prior to an inlet of the first turbine section as related to a pressure at an outlet.

These and other features may be best understood from the following drawings and specification.

BRIEF DESCRIPTION OF THE DRAWINGS

FIG. 1 shows a gas turbine engine.
FIG. 2 schematically shows the arrangement of the low and high spool, along with the fan drive.
FIG. 3 schematically shows an alternative drive arrangement.

DETAILED DESCRIPTION

Figure 4:
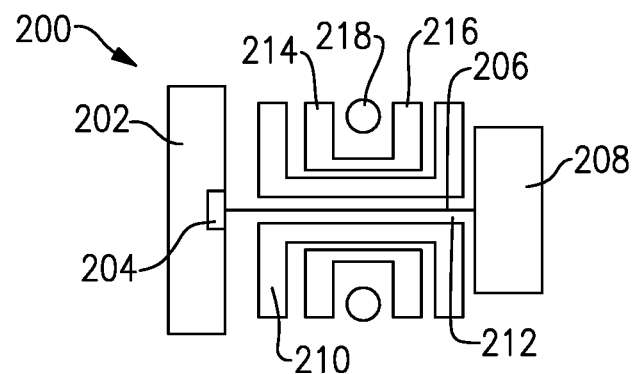
FIG. 4 shows another embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10) or greater than thirteen (13), but less than twenty two (22), the geared architecture 48 is an epicyclic gear train, such as a planetary gear system or other gear system, with a gear reduction ratio of greater than about 2.3 and the low pressure turbine section 46 has a pressure ratio that is greater than about 5, in some embodiments greater than about 7, in some embodiments greater than about 7.5, in some embodiments greater than 10, and in some embodiments less than 20, or less than 14, or less than 12. In one disclosed embodiment, the engine 20 bypass ratio is greater than about thirteen (13:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1.

When it is desired that the fan rotate in the same direction as the low pressure turbine section, then a planetary gear system may be utilized. On the other hand, if it is desired that the fan rotate in an opposed direction to the direction of rotation of the low pressure turbine section, then a star-type gear reduction may be utilized. A worker of ordinary skill in the art would recognize the various options with regard to gear reductions available to a gas turbine engine designer. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 42 may have 26 or fewer blades.

An exit area 400 is shown, in FIG. 1 and FIG. 2, at the exit location for the high pressure turbine section 54. An exit area for the low pressure turbine section is defined at exit 401 for the low pressure turbine section. As shown in FIG. 2, the turbine engine 20 may be counter-rotating. This means that the low pressure turbine section 46 and low pressure compressor section 44 rotate in one direction, while the high pressure spool 32, including high pressure turbine section 54 and high pressure compressor section 52 rotate in an opposed direction. The gear reduction 48, may be selected such that the fan 42 rotates in the same direction as the high spool 32 as shown in FIG. 2.

Another embodiment is illustrated in FIG. 3. In FIG. 3, the fan rotates in the same direction as the low pressure spool 30. To achieve this rotation, the gear reduction 48 may be a planetary gear reduction which would cause the fan 42 to rotate in the same direction. With either arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp} = (A_{lpt} \times V_{lpt}^2) \qquad \text{Equation 1:}$$

$$PQ_{hpt} = (A_{hpt} \times V_{hpt}^2) \qquad \text{Equation 2:}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2) = PQ_{ltp}/PQ_{hpt} \qquad \text{Equation 3:}$$

In one turbine embodiment made according to the above design, the areas of the low and high pressure turbine sections are 557.9 in$^2$ and 90.67 in$^2$, respectively. Further, the speeds of the low and high pressure turbine sections are 10179 rpm and 24346 rpm, respectively. Thus, using Equations 1 and 2 above, the performance quantities for the low and high pressure turbine sections are:

$$PQ_{ltp} = (A_{lpt} \times V_{lpt}^2) = (557.9 \text{ in}^2)(10179 \text{ rpm})^2 = 57805157673.9 \text{ in}^2 \text{ rpm}^2 \qquad \text{Equation 1:}$$

$$PQ_{hpt} = (A_{hpt} \times V_{hpt}^2) = (90.67 \text{ in}^2)(24346 \text{ rpm})^2 = 53742622009.72 \text{ in}^2 \text{ rpm}^2 \qquad \text{Equation 2:}$$

and using Equation 3 above, the ratio for the low pressure turbine section to the high pressure turbine section is:

$$\text{Ratio} = PQ_{ltp}/PQ_{hpt} = 57805157673.9 \text{ in}^2 \text{ rpm}^2/53742622009.72 \text{ in}^2 \text{ rpm}^2 = 1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more work in fewer stages. The low pressure compressor section may be made smaller in radius and shorter in length while contributing more toward achieving the overall pressure ratio design target of the engine. Moreover, as a result of the efficiency increases in the low pressure turbine section and the low pressure compressor section in conjunction with the gear reductions, the speed of the fan can be optimized to provide the greatest overall propulsive efficiency.

FIG. 4 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 5:
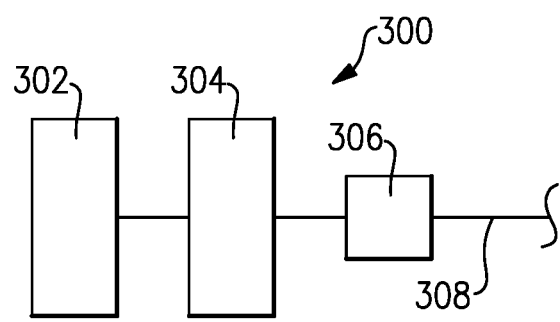
FIG. 5 shows yet another embodiment.

FIG. 5 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section. This arrangement enables greater flexibility in the low spool speeds, and thus alternatives for the performance quantities for the low pressure turbine section and high pressure turbine section, and the performance quantity ratio.

With the FIG. 5 embodiment, significant performance benefits may be achieved using a ratio of the performance quantity for the low pressure turbine section to the performance quantity for an associated high pressure turbine section that is less than or equal to 0.8. In further embodiments, the ratio might be less than 0.5. Also, the ratio may be greater than 0.2. Alternatively, in some embodiments of the arrangement shown in FIG. 5, it could be beneficial to set the ratio as high as 1.5.

While the embodiment shown in FIGS. 1-3 discloses a speed of the high pressure turbine being more than twice, and less than three times, the speed of the fan drive turbine (as provided by the exemplary numbers), the FIG. 5 embodiment might have a different ratio. As an example, the speed of the low pressure turbine which drives the compressor rotor 304 and fan rotor 302 through a gear reduction, may have a speed which is less than in the above embodiments. Thus, the speed of the high pressure turbine may be greater than three times the speed of the low pressure turbine, and less than four times the speed in a FIG. 5 type engine.

Further, the gear ratio of the gear reduction 36 may be greater than or equal to 2.0 and less than or equal to 5.0. Also, the low fan pressure ratio may be greater than or equal to 1.2 and less than or equal to 1.45, and more preferably less than or equal to 1.35.

The FIG. 4 or 5 engines may be utilized with the features disclosed above.

While this invention has been disclosed with reference to one embodiment, it should be understood that certain modifications would come within the scope of this invention. For that reason, the following claims should be studied to determine the true scope and content of this invention.

The invention claimed is:

1. A gas turbine engine comprising:
   a fan including fan blades, and an outer housing that surrounds said fan to define a bypass flow path;
   a bypass ratio greater than 10 and less than 22 at a cruise condition;
   a compressor section in fluid communication with said fan, said compressor section including a first compressor section and a second compressor section;
   a combustion section in fluid communication with said compressor section;
   a turbine section in fluid communication with said combustion section;
   wherein the turbine section includes a first turbine section driving said fan and said first compressor section and a second turbine section driving said second compressor section and a second compressor rotor;
   wherein said first turbine section has a first exit area at a first exit point and rotates at a first speed;
   wherein said second turbine section has a second exit area at a second exit point and rotates at a second speed, which is higher than said first speed;
   wherein a first performance quantity is defined as a product of the first speed squared and said first area;
   wherein a second performance quantity is defined as a product of the second speed squared and said second exit area;
   wherein a performance ratio of said first performance quantity to said second performance quantity is between 0.2 and 0.8; and
   wherein a gear reduction is included between said first turbine section and said first compressor section, such that said first compressor section and said fan rotate at a lower speed than said first turbine section.

2. The gas turbine engine as set forth in claim 1, wherein said gear reduction is a planetary gear reduction.

3. The gas turbine engine as set forth in claim 2, wherein a gear ratio of said gear reduction is greater than 2.0 and less than 5.0.

4. The gas turbine engine as set forth in claim 3, wherein said gear ratio is greater than 2.5.

5. The gas turbine engine as set forth in claim 1, wherein said performance ratio is less than or equal to 0.5.

6. The gas turbine engine as set forth in claim 5, wherein said second speed is between three and four times said first speed.

7. The gas turbine engine as set forth in claim 6, wherein a gear ratio of said gear reduction is greater than 2.0 and less than 5.0.

8. The gas turbine engine as set forth in claim 7, wherein said gear ratio is greater than 2.5.

9. The gas turbine engine as set forth in claim 1, wherein said second speed is greater than twice said first speed and less than three times said first speed.

10. The gas turbine engine as set forth in claim 9, wherein said fan has 26 or fewer fan blades and said first turbine section has at least three stages and has up to six stages.

11. The gas turbine engine as set forth in claim 10, wherein said gear reduction is a planetary gear reduction.

12. The gas turbine engine as set forth in claim 11, wherein a low fan pressure ratio is less than 1.35 across the fan blades alone at said cruise condition.

13. A gas turbine engine comprising:
   a fan including fan blades, and an outer housing that surrounds said fan to define a bypass flow path;
   a first turbine section;
   a second turbine section;
   wherein said first turbine section has a first exit area at a first exit point and rotates at a first speed, said first turbine section having at least 3 stages;
   wherein said second turbine section has a second exit area at a second exit point and rotates at a second speed, which is faster than said first speed, said second turbine section having 2 or fewer stages;
   wherein a first performance quantity is defined as a product of said first speed squared and said first area;
   wherein a second performance quantity is defined as a product of said second speed squared and said second area;
   wherein a ratio of said first performance quantity to said second performance quantity is between 0.5 and 1.5;
   wherein a gear reduction is included between said fan and a low spool driven by said first turbine section such that said fan rotates at a lower speed than said first turbine section; and
   said first and second turbine sections are designed to rotate in opposed directions relative to each other.

* * * * *